(12) United States Patent
Ijzerman et al.

(10) Patent No.: US 8,035,762 B2
(45) Date of Patent: Oct. 11, 2011

(54) 2D/3D IMAGE DISPLAY

(75) Inventors: Willem L. Ijzerman, Eindhoven (NL); Hugo J. Cornelissen, Waalre (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1287 days.

(21) Appl. No.: 10/581,215

(22) PCT Filed: Dec. 2, 2004

(86) PCT No.: PCT/IB2004/052643
§ 371 (c)(1),
(2), (4) Date: May 30, 2006

(87) PCT Pub. No.: WO2005/055617
PCT Pub. Date: Jun. 16, 2005

(65) Prior Publication Data
US 2008/0278640 A1    Nov. 13, 2008

(30) Foreign Application Priority Data

Dec. 3, 2003  (GB) .................................. 0328005.4

(51) Int. Cl.
*G02F 1/1335* (2006.01)
*H04N 13/04* (2006.01)

(52) U.S. Cl. ................ 349/15; 349/96; 348/51

(58) Field of Classification Search .......... 349/15, 349/96; 348/51
See application file for complete search history.

(56) References Cited

U.S. PATENT DOCUMENTS

| | | | |
|---|---|---|---|
| 6,064,424 A | 5/2000 | Van Berkel et al. | |
| 6,157,424 A * | 12/2000 | Eichenlaub | ............. 349/74 |
| 6,239,907 B1 | 5/2001 | Allen et al. | |
| 7,477,331 B2 * | 1/2009 | Lin et al. | ............. 349/15 |
| 2003/0107686 A1 | 6/2003 | Sato et al. | |
| 2005/0062905 A1 * | 3/2005 | Kim et al. | ............. 349/95 |
| 2005/0134762 A1 * | 6/2005 | Sung et al. | ............. 349/96 |
| 2006/0139448 A1 * | 6/2006 | Ha et al. | ............. 348/51 |

FOREIGN PATENT DOCUMENTS

| | | |
|---|---|---|
| WO | 9732223 A1 | 9/1997 |
| WO | 03015424 A2 | 2/2003 |

OTHER PUBLICATIONS

Jesse B. Eichenlaug, "Developments in Autostereoscopic Technology at Dimension Technologies Inc.", Proceedings of the SPIE, vol. 1915, Feb. 1, 1993, pp. 177-186, p. 177-186.
Jesse Eichenlaub, "A Lightweight, compact 2D/3D Autostereoscopic LCD Backlight for Games, Monitor, and Notebook Application" Proceedings of the SPIE, vol. 3012, Feb. 11, 1997, pp. 274-281.

* cited by examiner

*Primary Examiner* — David Nelms
*Assistant Examiner* — David Y Chung

(57) ABSTRACT

A display (8) comprises a display panel (9), a polariser (10), a polarisation rotator (13), and a scatterer (12) arranged to scatter light having a first polarisation as compared with light having a second polarisation. The display (8) can be switched between 2D and 3D modes by operating the polarisation rotator (13) accordingly. In 3D mode, the polarisation rotator (13) transmits light with relatively little or no change to its polarisation. Light transmitted by the scatterer (12) is then used to present a three-dimensional image (50). In 2D mode, the polarisation rotator (13) alters the polarisation of the light and light that is scattered by the scatterer (12) is used to present a two-dimensional image (51). The polarisation rotator (13) maybe arranged so that light incident on a first area thereof undergoes a different change in polarisation to light incident on a second area, in order to allow simultaneous presentation of 2D and 3D images (51, 50).

26 Claims, 10 Drawing Sheets

2D/3D IMAGE DISPLAY

The present invention relates to display that is capable of presenting two-dimensional and three-dimensional images.

Light shutter display devices, such as liquid crystal displays (LCDs), in which a backlight is modulated on a pixel-by-pixel basis using a liquid crystal matrix, are well-known. Such devices generally produce a two-dimensional (2D) image. However, rapid progress has been made in the research and development of three-dimensional (3D) displays. For reasons of cost effectiveness and user convenience, display systems that do not require the user to wear special glasses in order to perceive a 3D image have been developed. These display systems are called autostereoscopic displays.

Autostereoscopic displays typically comprise a conventional display panel, such as a liquid crystal display (LCD), together with means for providing a pair of images, in which one image is presented to a viewer's left eye and the other image is presented to the viewer's right eye. In some prior art displays, a 3D image is produced using a lenticular screen placed in front of the display panel. In such arrangements, the lenses focus light from different columns of pixels or sub-pixels into different regions of space, so that a viewer standing at a predetermined distance from the display panel will perceive a 3D image.

A less complex method for presenting 3D images uses a parallax barrier. Referring to FIG. 1, a conventional barrier-type autostereoscopic display 1 comprises a display panel 2, a backlight 3 and a barrier 4. Typically, the barrier 4 is an opaque screen with a pattern of parallel transparent lines or slits 5a to 5d and is placed either between the backlight 3 and display panel 2 or in front of the display panel 2. When in use, light emitted by the backlight 3 is transmitted through the slits 5a to 5d of the barrier 4, so that the display panel 2 is illuminated by what is effectively a plurality of narrow elongate light sources. Alternate columns of sub-pixels of the display panel 2 are driven to display a left-eye image A and a right-eye image B respectively. The sub-pixels have a pitch $p_d$ and the display panel 2 is positioned a distance c from the barrier 4, such that each "elongate light source" illuminates one pair of sub-pixel columns. When the display 1 is used by a viewer 6 at a distance d from the display panel 2, the user's left and right eyes perceives the left-eye and right-eye images A, B respectively. However, as the barrier 4 blocks most of the light generated by the backlight 3, this type of arrangement is inefficient.

Moreover, in both prior arrangements discussed above, the display panel 2 is illuminated by vertical light lines. A small error in the pitch of the light lines with respect to the pitch $p_d$ of the sub-pixels may result in visual artifacts in the displayed image, in the form of a Moiré pattern. One technique for avoiding such artifacts is to arrange the backlight 3 so that the light lines are slanted relative to the columns of sub-pixels in the display panel 2, as described in respect of a display comprising a lenticular screen in U.S. Pat. No. 6,064,424. This technique reduces the resolution of the display but the resolution loss is distributed between the horizontal and vertical directions.

In the case of an autostereoscopic display having two views A, B, a displayed 3D image can only be viewed from one perspective. For example, where the 3D image represents an object, the image displayed represents the object when viewed from one angle. However, it is possible for a display to show the object from more than one perspective. In order to provide a 3D image that is viewable from multiple perspectives and/or to allow the viewer greater freedom of movement, more views C, D etc. are required.

In a display where the light lines are not slanted with respect to the sub-pixel columns, the relationship between the pitch of the line sources $p_l$ and the number of views m as follows, $$P_l = \frac{a \cdot p_d}{a - p_d} m \approx p_d \cdot m \quad [1]$$

where $p_d$ is the pitch of the sub-pixels and a is the required parallax between each view at the position of the user. The relationship between the viewing distance d, the parallax a and the barrier-to-panel distance c is given by equation 2, $$a \approx \frac{d}{c} \cdot p_d \quad [2]$$

Regardless of whether an autostereoscopic display comprises a physical barrier or a lenticular screen, alternate pixels of the display panel are used to create different views A, B, C, D and so on. Therefore, a 3D image can only be displayed with a resolution that is relatively low when compared with a 2D image displayed on the same apparatus. While this may not be problematical when high resolution images are not required, this reduced resolution may not be acceptable for the display of text or other 2D images. This problem has been overcome, to some extent, by providing displays that can be switched between 2D and 3D imaging modes.

Where a switchable display includes a physical barrier, it may be necessary to include a switchable diffuser 7 between the barrier 4 and display panel 2. When the display 1 is used in a 3D imaging mode, the diffuser 7 is switched into a transmissive state to allow light transmitted by the slits 5a to 5d to pass through. In a 2D imaging mode, the diffuser 7 is switched into a diffusing state, so that light from the backlight 3 is scattered and the display panel 2 is uniformly illuminated. However, as noted above, barrier arrangements are inefficient, as a significant proportion of the light generated by the backlight 3 is lost. For instance, in 2D imaging modes, a significant proportion of the light may be scattered away from the display panel 2. In 3D mode, the light that does not enter the slits 5a to 5d is wasted.

In another prior switchable display, disclosed in WO 03/015424 A2, a LCD without an analysing polariser is provided. A lenticular screen, comprising an array of birefringent lenses, is positioned in front of the LCD, together with a liquid crystal (LC) cell, which acts as a switchable half-wave plate, and an analysing polariser. The display is switched between 2D and 3D imaging modes using the LC cell. When a 2D image is displayed, the LC cell alters the polarisation of light passing through it. When a 3D image is displayed, the display is operated so that light passes through the LC cell without any change in its polarisation. Light passing through the LC cell may then pass through the analysing polariser if it has the appropriate polarisation. However, this prior display works in different modes depending on whether 2D or 3D images are displayed. When 2D images are displayed, the display operates in one of a "normally black" mode and a "normally white mode" and, when 3D images are displayed, the display operates in the other of the "normally black" mode and the "normally white" mode. In most circumstances, this prior display would be optimised for one of the "normally white" and "normally black" modes, so that operation in the other of the two modes results in relatively poor contrast and, therefore, reduced image quality. Furthermore, in this prior display, the lenticular screen must comprise an array of non-standard, polarisation-selective, microlenses. Such an array is expensive to manufacture, due to the high cost of the required materials and the complexity of its fabrication.

The invention is intended to achieve one or more of the following objects: the provision of a display that is capable of displaying both 2D and 3D images with a greater light efficiency than prior barrier methods, which may be less expensive and simpler to manufacture than prior switchable displays, and the provision of a display that can present 2D and 3D images separately or simultaneously without decreasing the resolution of the 2D image.

According to a first aspect of the invention, a display comprises a display panel, a polariser, a polarisation rotator that is selectively operable to change the polarisation of light transmitted therethrough and a polarisation dependent scatterer configured to scatter light having a first polarisation relative to light having a second polarisation, the polarisation rotator being operable so that, in a first display mode, light scattered by the scatterer is used to present a two-dimensional image and, in a second display mode, relatively unscattered light is used to present a three-dimensional image.

When light is incident on the polarisation-dependent scatterer, light with a first polarisation is scattered, while light of a second polarisation passes through relatively unscattered. In some embodiments, where light of the first and second polarisations from a light line is incident on the scatterer, the scatterer scatters light with the first polarisation which may then provide uniform backlighting for the presentation of a 2D image, while letting the light of the second polarisation pass through with little or no scattering, to provide suitable backlighting for presenting a 3D image, in the form of a pattern of light lines.

The use of a polarisation-dependent scatterer instead of, say, a birefringent lenticular screen, confers a number of advantages over the prior art discussed above. For example, the scatterer may be formed of less expensive materials and its manufacture considerably less complex. Furthermore, the scatterer does not need to be precisely aligned with the light lines generated by the illumination system and/or sub-pixels or pixels of the display panel, thereby simplifying the assembly of the display.

Said light may be used to present a two-dimensional or three-dimensional image by providing illumination for the display panel or by conveying image information to one or more viewing zones.

The polarisation rotator may be configured so that, in the first display mode, light entering the polarisation rotator, having a first input polarisation, has the second polarisation when leaving the polarisation rotator, while light entering the polarisation rotator, having a second input polarisation, has the first polarisation when leaving the polarisation rotator, and, in the second display mode, light entering the polarisation rotator, having a first input polarisation, has the first polarisation when leaving the polarisation rotator, while light entering the polarisation rotator, having a second input polarisation, has the second polarisation when leaving the polarisation rotator. In some embodiments, the first and second input polarisations may be the substantially the same as the first and second polarisations respectively. Such a polarisation rotator may be operable so that light entering a first area of the polarisation rotator having the first and second input polarisations, leave the polarisation rotator with the first and second polarisations respectively, while light entering a second area of the polarisation rotator having the first and second input polarisations leave the polarisation rotator with the second and first polarisations respectively. This feature permits the display to present 2D and 3D images simultaneously.

The display may comprise an illumination system arranged to generate a plurality of light lines comprising components having the first polarisation and components having the second polarisation. Optionally, a lenticular screen may also be provided and arranged to image the light lines at a position between the lenticular screen and the display panel. In such an arrangement, the polariser may be positioned between said illumination system and a lenticular screen, the lenticular screen being arranged to create an image of the light lines by focussing the components of having the first polarisation, at a position between the lenticular screen and the display panel. In both cases, the lenticular screen may comprise an array of standard lenses configured to refract incident light regardless of its polarisation.

Alternatively, the display panel may be a light-emissive display device.

The display panel may be a liquid crystal device (LCD) in which a rear polariser or a top polariser is not provided. Alternatively, the display panel may be a liquid crystal device and the polariser may be a rear polariser of the liquid crystal device.

The scatterer may comprise a foil in which a plurality of elongate particles are dispersed or a foil embossed with a grating pattern. The foil may be a stretched foil formed of PET or PEN.

The display may comprise a second scatterer, configured to scatter light having the second polarisation relative to light having the first polarisation. When the display is operated in a 3D imaging mode, the second scatterer may scatter the light used to present the 3D image, thereby increasing the sizes of the viewing zones.

The invention also provides a device comprising such a display, for example a communication device, such as a mobile telephone, a computing device or a display device for or in audio/visual equipment, and use of such a display or device.

Embodiments of the invention will now be described, by way of example, with reference to the accompanying drawings, in which.

Figure 2:
FIG. 2 is a schematic diagram of a display according to a first embodiment of the invention showing light paths through the display when operating in 3D and 2D imaging modes.
Figure 2:
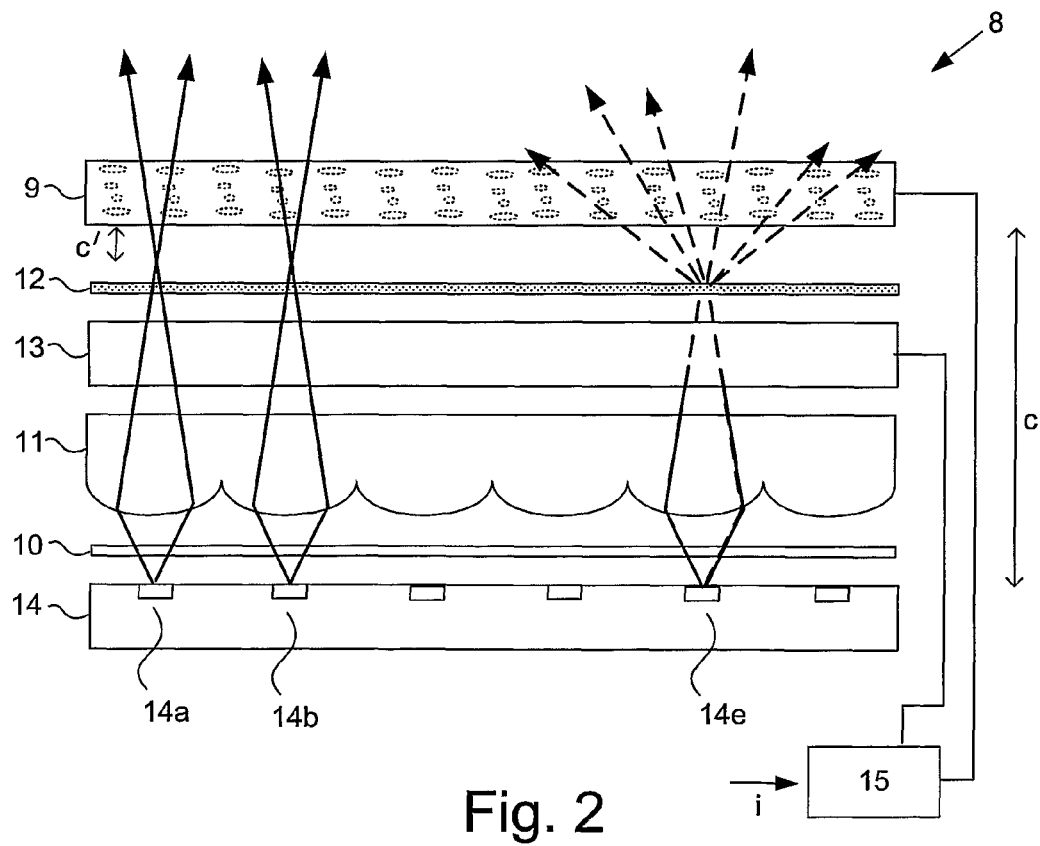

FIG. 2 depicts a display 8, comprising a display panel 9, in which a two-dimensional array of sub-pixels is defined, a polariser 10, a lenticular screen 11, a polarisation-dependent scatterer 12 and a switchable polarisation rotator 13. The display 8 also comprises an illumination system 14, arranged to generate backlighting for the display panel 9, as will be described in detail later. In this particular example, each light line causes a column of four sub-pixels in the display panel 9 to be illuminated. Each of the sub-pixels within the column may present a different view, for example, views A, B, C and D, so that a viewer positioned at a suitable location may perceive a 3D image by registering an appropriate pair of views.

In this particular embodiment, the display panel 9 and the polarisation rotator 13 each comprise a layer of electro-optically active material, such as a liquid crystal material, sandwiched between two light-transmissive substrates (not shown). In the case of a liquid crystal layer, the operation of the layer may be based on, for example, a twisted nematic (TN), super-twisted nematic (STN), vertically aligned nematic (VAN), optically compensated birefringence (OCB), in-plane switching nematics (IPS) or ferro-electric effect for modulating a polarisation direction of incident light. The layer of electro-optically active material is sandwiched between two substrates (not shown), made from a transparent material such as, for example, glass, silicon dioxide ($SiO_2$), quartz or a suitable plastic material.

The display panel 9 is subdivided into an array of sub-pixels and is provided with an active matrix or a passive matrix arrangement (not shown) for driving the pixels to display an image, in a manner well known per se. The display panel 9 also comprises a front polariser, or analyser, (not shown), which transmits light exiting the liquid crystal layer with an appropriate polarisation, and retarders (not shown) but, unlike conventional display panels, no rear polariser is provided.

The polarisation rotator 13 is arranged so that it can operate in a first mode, in which the pixels of the polarisation rotator 13 may change the polarisation of light passing through them from a first input polarisation to a first output polarisation, referred to hereafter as S-polarisation, and from a second input polarisation to a second output polarisation, referred to hereafter as P-polarisation. The polarisation rotator 13 can also operate in a second mode, in which incident light having the first input polarisation leaves the polarisation rotator 13 with the second output polarisation, that is, P-polarisation, while incident light having the second input polarisation leaves the polarisation rotator 13 with the first output polarisation, S-polarisation. In this particular example, when operating in the second mode, the polarisation rotator 13 changes to polarisation of light passing through it from P- to S-polarisation and vice versa, while, in the first mode, the polarisation of light passing through the polarisation rotator 13 is unchanged.

If required, the polarisation rotator 13 may be subdivided into an array of pixels, as in this particular embodiment. The polarisation rotator 13 is thus provided with an active matrix or a passive matrix arrangement (not shown) for driving the pixels. By driving the pixels accordingly, the polarisation rotator 13 may be switched between first and second modes. Such an arrangement also permits different pixels of the polarisation rotator 13 to be operated in different modes simultaneously, so that light passing through one region of the polarisation rotator 13 is subjected to a change in polarisation while light passing through another region is unaffected.

In this example, the display panel 9 and polarisation rotator 13. The controller 15 is arranged to receive image signals i and to drive the sub-pixels of the display panel 9 and polarisation rotator 13 accordingly, by supplying appropriate signals to their respective active matrix or passive matrix arrangements. If required, the controller 15 may also control the illumination system 14.

The polarisation-dependent scatterer 12 comprises a foil that scatters incident light that is linearly polarised in a first direction to a much greater degree than light that is linearly polarised in a second direction. In this example, the scatterer 12 scatters S-polarised light, while P-polarised light undergoes relatively little, or no, scattering.

Suitable scattering foils are disclosed in WO97/32223 A1, which describes a film comprising a substantially non-birefringent phase of polymeric particles, dispersed within a continuous birefringent polymeric matrix. The refractive indices of the dispersed phase and polymeric matrix are similar along two orthogonal directions but differ significantly from one another along a third orthogonal direction. Incident light that is polarised parallel to the third orthogonal direction is scattered to a much greater degree than incident light that is polarised parallel to the other orthogonal directions.

Figure 3A:
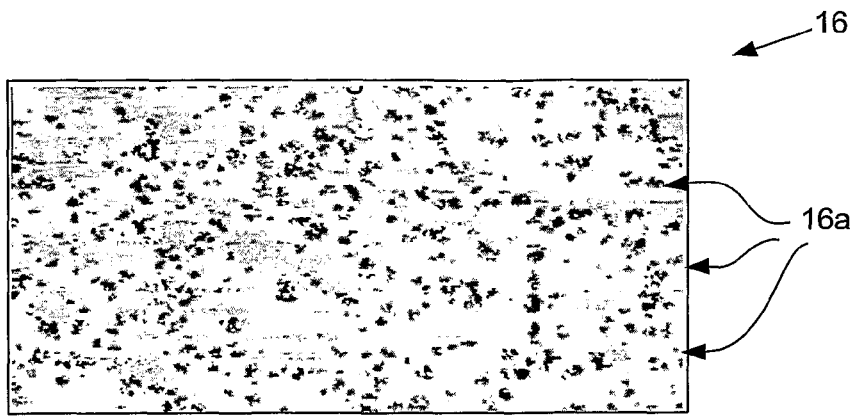
FIGS. 3a and 3b depict a scattering element suitable for use in the display of FIG. 2.
Figure 3B:
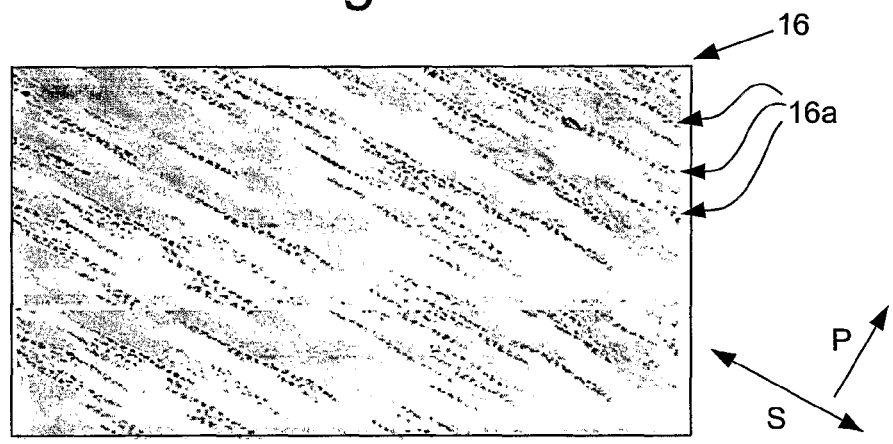

An example of a suitable scattering element for the scatterer 12 is shown in FIGS. 3a and 3b, in the form of a foil 16 comprising core-shell particles 16a dispersed in a poly ethylene terephtalate (PET) matrix, in a ratio of 1:9 by weight. In this example, the core-shell particles 16a have an initial diameter of approximately 200 nm, but are extruded and stretched along a given direction S by a factor of 4. FIG. 3a is a cross-sectional view of the foil 16 perpendicular to the stretching direction S, while FIG. 3b shows a cross-section of the foil parallel to the stretching direction S.

Light is incident on the scatterer 12 along a direction that is perpendicular to the stretch direction S. In FIG. 3b, the incident light is directed into the page. Light polarised in a direction parallel to the stretching direction S which, in this embodiment, is S-polarised light, is scattered. However, light polarised along an orthogonal direction P, here, P-polarised light, passes through the foil 16 with relatively little, or no, scattering when compared with the S-polarised light.

Figure 4:
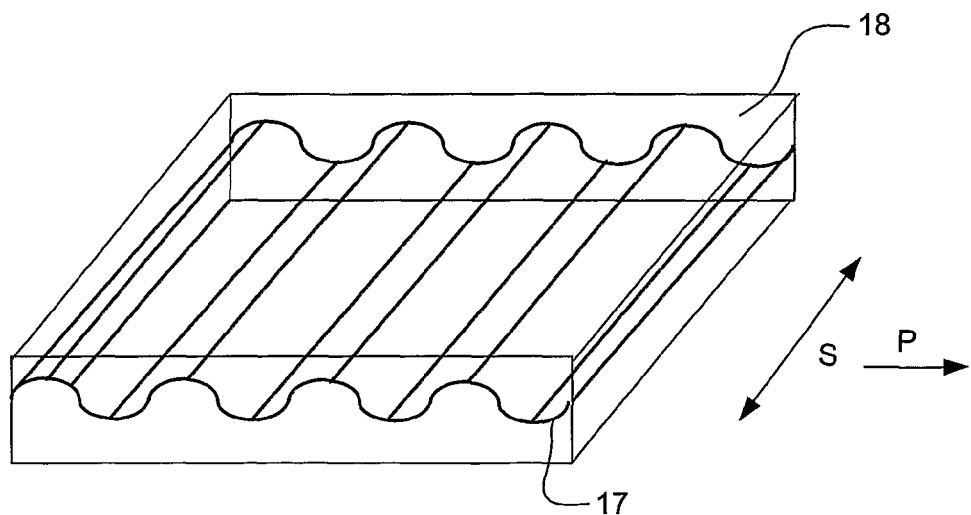
FIG. 4 depicts another scattering element suitable for use in the display of FIG. 2.

FIG. 4 depicts another example of a suitable scattering element. A foil 17, of PET, poly ethylene naphtalate (PEN) or a similar polymer is extruded and stretched by a factor of 4 to 5, so that its refractive index n1 along the stretch direction S is higher than its refractive index n2 perpendicular to the stretch direction S. For example, for a PET foil, the refractive indices n1 and n2 may be 1.7 and 1.53 respectively. For a PEN foil, the refractive indices n1 and n2 may be 1.85 and 1.56 respectively. The foil 17 is then embossed with a micrograting pattern and provided with a coating 18 with a refractive index that is substantially matched to the refractive index n2 of the foil 17, perpendicular to the stretching direction S.

While FIG. 4 shows a foil 17 embossed with a regular pattern, it is not necessary for the micrograting pattern to have a constant period. In fact, in an alternative scatterer, an embossed surface may be configured with a variety of sloped facets in order to provide refracting and diffusing effects.

The scatterer 12 is preferably configured so that light is scattered predominantly in a narrow range of angles in the forward direction, towards the display panel 9. In this manner, backscattering, which would result in diffuse background illumination and degrade the contrast of the light lines when the display is in 3D mode, may be reduced.

The lenticular screen 11 comprises an array of standard lenses that refract incident light regardless of its polarisation. However, if the incident light is polarised in a direction that is neither parallel nor orthogonal to the lens surface, the refraction may alter its polarisation. If this is the case, it may be necessary to arrange the polariser 10 and/or the scatterer 12, so that they are appropriately orientated. However, the alignment of the lenticular screen 11 with the polariser 10 and scatterer 12 need not be exact, as a minor misalignment will not prevent the functioning of the display. In embodiments where the lenticular screen 11 is placed at a slant to the sub-pixel columns, for example, to avoid the generation of Moiré effects and other visual artifacts, the polariser 10 and scatterer 12 must be orientated accordingly. In both cases, the illumination system 14 must be arranged to generate light lines that are aligned with the lenticular screen 11.

For the purposes of the following discussion, P-polarisation refers to linear polarisation along a direction parallel to the plane of the figures, while polarisation orthogonal to the plane of the figures will be referred to as S polarisation. However, it should be noted that the two polarisation directions need not be those described and also that arrangements are possible in which the action of the scatterer 12 on P and S polarised light is interchanged, if necessary, with corresponding changes to the polariser 10, without affecting the performance of the invention.

FIG. 2 depicts the light paths followed by light lines emitted by the illumination system 14 at positions 14a, 14b when the display 8 is in a 3D imaging mode. The light lines generated by the illumination system 14 includes both P- and S-polarised light. However, the S-polarised components of the light are largely blocked by the polariser 10, and so the light that passes through the polariser 10 for imaging by the lenticular screen 11 is generally P-polarised.

The lenticular screen 11 focuses the light so as to produce an image of the light lines at a position between the lenticular screen 11 and the display panel 9. This imaging reduces the effective distance between the illumination system 14 and display panel 9. In other words, the effect of this arrangement is equivalent to generating the light lines at a reduced distance c' from the display panel 9, as compared with the actual distance c between the illumination system 14 and the display panel 9.

The P-polarised light enters the polarisation rotator 13, which, in this example, is operated in its second mode, and so allows P-polarised light to be transmitted without any change to its polarisation. Here, the scatterer 12 is largely translucent for P-polarised light. The display panel 9 is thus illuminated by P-polarised light lines, permitting the presentation of a 3D image in a "normally white" mode.

FIG. 2 also shows the light path followed by a light line emitted by the illumination system 14 at position 14e when the display 8 is in a 2D imaging mode. In this figure, P-polarised light is shown using solid lines, while S-polarised light is represented by dashed lines.

Figure 5:
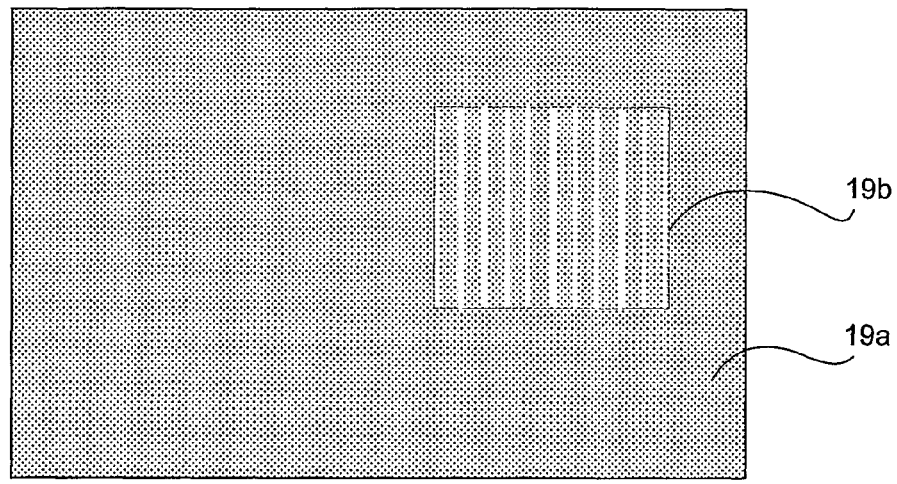
FIG. 5 depicts the light emerging from a polarisation rotator of the display of FIG. 2 when 2D and 3D images are displayed simultaneously.

Here, P-polarised components of the light in the light lines pass through the polariser 10 and is imaged by the lenticular screen 11. However, the polarisation rotator 13 is switched into its first mode, so that the P-polarised light emerges from the polarisation rotator 13 as S-polarised light. The S-polarised light is scattered by the scatterer 12 in random directions, thereby providing uniform illumination for the display panel 9 for presentation of a 2D image. In this case, the display panel 9 is driven in a "normally black" mode. However, the displayed image can be electronically inverted, by inverting imaging signals controlling the sub-pixels of the display panel 9, in a manner well known per se, so that a viewer will perceive the image as if it were displayed in a "normally white" mode.

Where the polarisation rotator 13 is divided into an array of pixels, as discussed above, it may be operated in both the first and second mode simultaneously, so that, for example, light passing through a first region of the polarisation rotator 13 may be subjected to a change in polarisation, while light passing through a second region is unaffected. As a result, suitable illumination is provided to allow the display 8 to present a 2D image and a 3D image simultaneously. For example, a 2D image, such as text, can be displayed at the same time as a 3D image, without a decrease in its resolution. An example of the illumination required for the simultaneous display of 2D and 3D images is shown in FIG. 5, in which light passing through the first region provides uniform illumination within a corresponding first area 19a of the display panel 9, while light passing through the second region forms a pattern of light lines for illuminating a corresponding second area 19b of the display panel 9. In this manner, the display 8 can present a 3D image "window" within a 2D image or vice versa.

Figure 6:
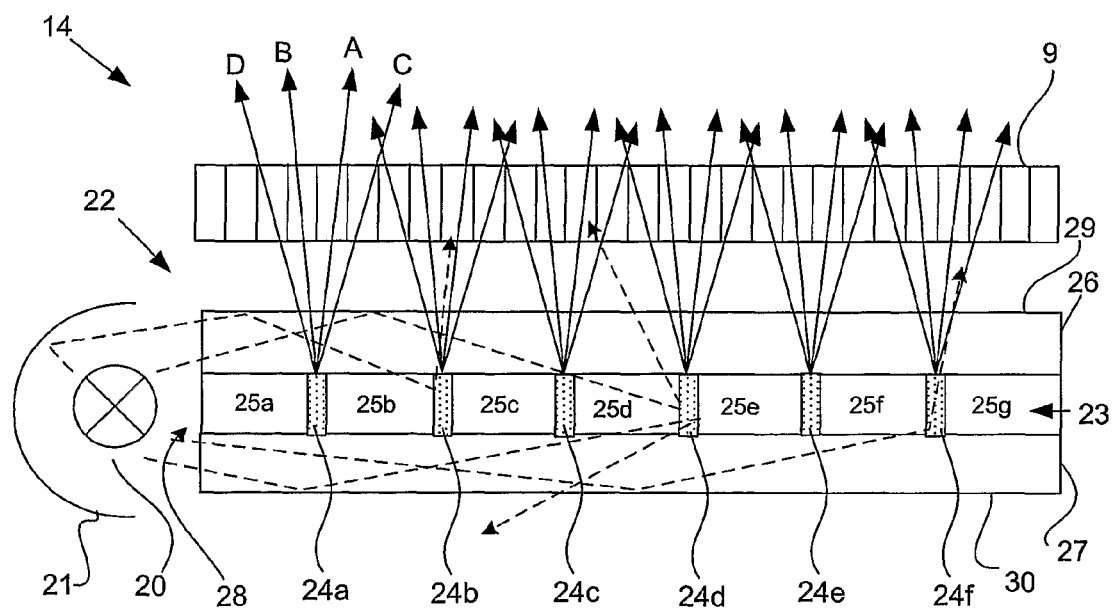
FIG. 6 is a schematic diagram of an illumination system suitable for use in the display of FIG. 2.

A suitable illumination system 14 for the display 8 is depicted in detail in FIG. 6. The illumination system 14 comprises a light source 20, such as a fluorescent rod lamp and, optionally, a reflector 21. The display panel 9 is also shown in this figure, although intervening components of the display 8, such as the polariser 10, lenticular screen 11, scatterer 12 and polarisation rotator 13, are omitted.

Light emitted by the light source 18 enters a waveguide 22, which comprises a diffusing layer 23 comprising an array of diffusing portions 24a to 24f. Examples of suitable diffusive materials include a polymer dispersed liquid crystal (PDLC), which is diffusive in the absence of an electric field and plastics material containing particles of another material for scattering incident light, such as Polymethyl methacrylate (PMMA) containing embedded titanium dioxide particles.

The diffusing portions 24a to 24f are separated by non-diffusing portions, 25a to 25g, which comprise a transparent material that is free from scattering particles. The diffusing layer 23 is sandwiched between substrates 26, 27. The substrates 26, 27 are made from a transparent material such as glass, silicon dioxide ($SiO_2$), quartz or a suitable plastic material. Preferably, the refractive indices of the non-diffusing regions and substrates 26, 27 are substantially equal.

An end face 28 of the waveguide 22 is arranged to receive light emitted by the light source 20 directly and also reflected light from the light source 20, if a reflector 21 is provided. The light propagates through the waveguide 22 and undergoes total internal reflection at the outer faces of the substrates 26, 27. However, light incident on a diffusing portion 24a to 24f is scattered in a random direction and may leave the waveguide 20 through an exit face 29 that is arranged to face the display panel 9. The light that leaves the waveguide 22 through the exit face 29 forms a pattern of light lines. Examples of paths followed within the waveguide 22 are shown using dashed lines.

The dimensions of the portions 24a to 24f, 25a to 25g are selected so that cross-talk between views A, B, C, D is limited to an acceptable level. In this particular example, the portions 25a to 25g have a width of approximately 405 μm, portions 24a to 24f have a width of approximately 50 μm. However, the dimensions used in other embodiments of the invention will depend on the type of display 8 and its sub-pixel size. As a general guide, the portions 24a to 24f, 25a to 25g are configured so that light lines are produced with a width selected from a range of 10 to 800 μm, with a pitch of between 100 μm to 10 mm. The width of the light line will be less than, or equal to, half the pitch in order to limit cross-talk.

Figure 1:
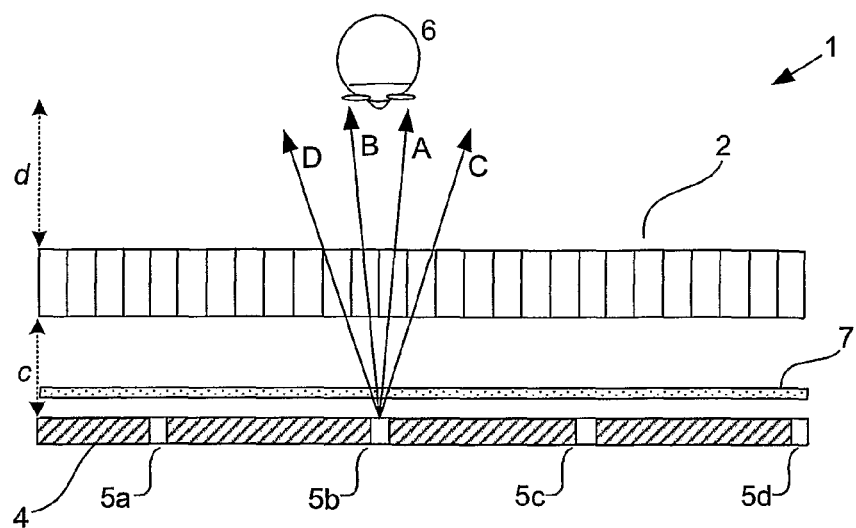
FIG. 1 is a schematic diagram of a known autostereoscopic display arrangement for producing multiple views of an image.

Light may continue to propagate through the waveguide 22 until it is scattered by a diffusing portion 24a to 24f and exits the waveguide 22 through one of the exit face 29, a face 30 of the substrate 26 remote from the display panel 9 or an end face, for example, end face 28, of the waveguide 20. In spite of the light loss through the faces of the waveguide 20 other than the exit face 29, the light efficiency of the waveguide 22 compares favourably with prior art barrier arrangements, such as that shown in FIG. 1, in which light lines are formed by blocking and discarding unwanted light. This light cannot be recovered without degrading the contrast of the light lines. However, in an alternative arrangement, such losses are reduced by providing a light-reflective surface (not shown) on, or instead of, substrate 27. As the diffusing layer 21 is situated close to the light-reflective surface, this arrangement increases light efficiency while generating a pattern of light lines with a reasonable contrast.

Further embodiments of the present invention will now be described. As the displays comprise many, or all of, the components of the display of FIG. 2, the same reference numerals will be used to indicate like components.

Figure 7:
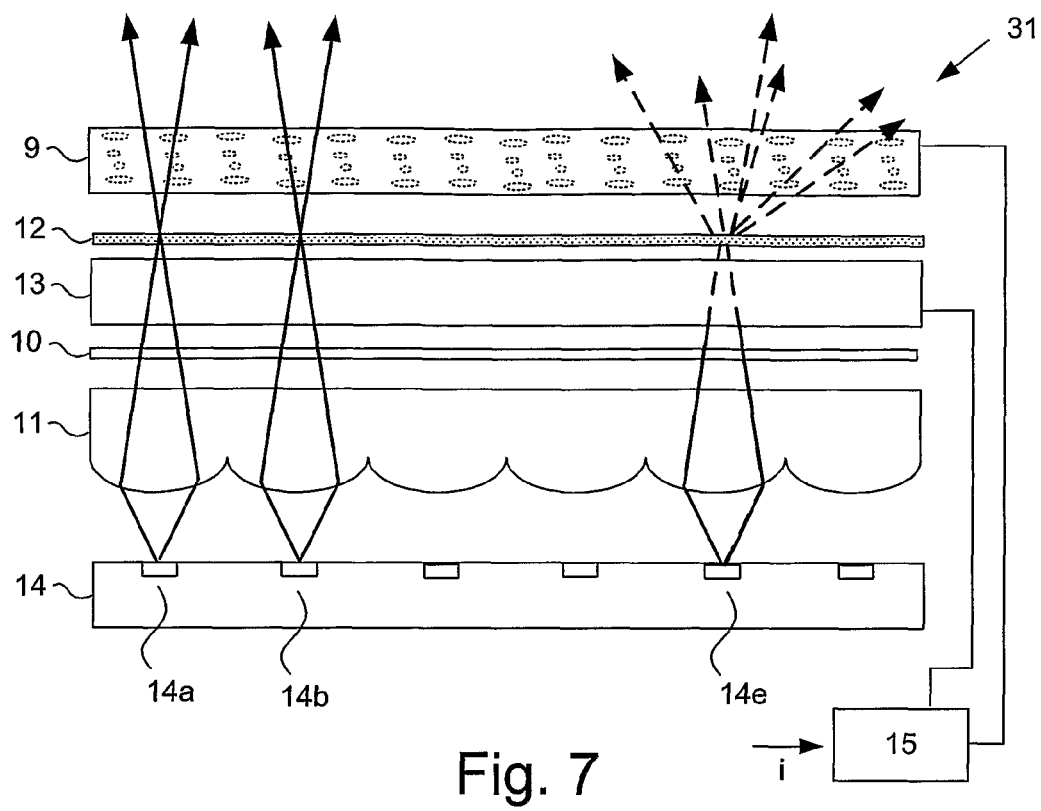
FIG. 7 is a schematic diagram a display according to a second embodiment of the invention showing light paths through the display when operating in 3D and 2D imaging modes.

FIG. 7 depicts a display 31 according to a second embodiment of the invention. Like the display 8 of FIG. 2, the display 31 comprises a display panel 9, a polariser 10, a lenticular screen 11, a polarisation-dependent scatterer 12, a polarisation rotator 13 and an illumination system 14. The display 31 differs from the display 8 of the first embodiment in that the polariser 10 is located between the lenticular screen 11 and polarisation rotator 13.

The illumination system 14 emits light lines including both P- and S-polarised components. The light lines are imaged by the lenticular screen 11. The P-polarised components of the light within the light lines is then transmitted by the polariser 10, while the S-polarised components are blocked.

Figure 8:
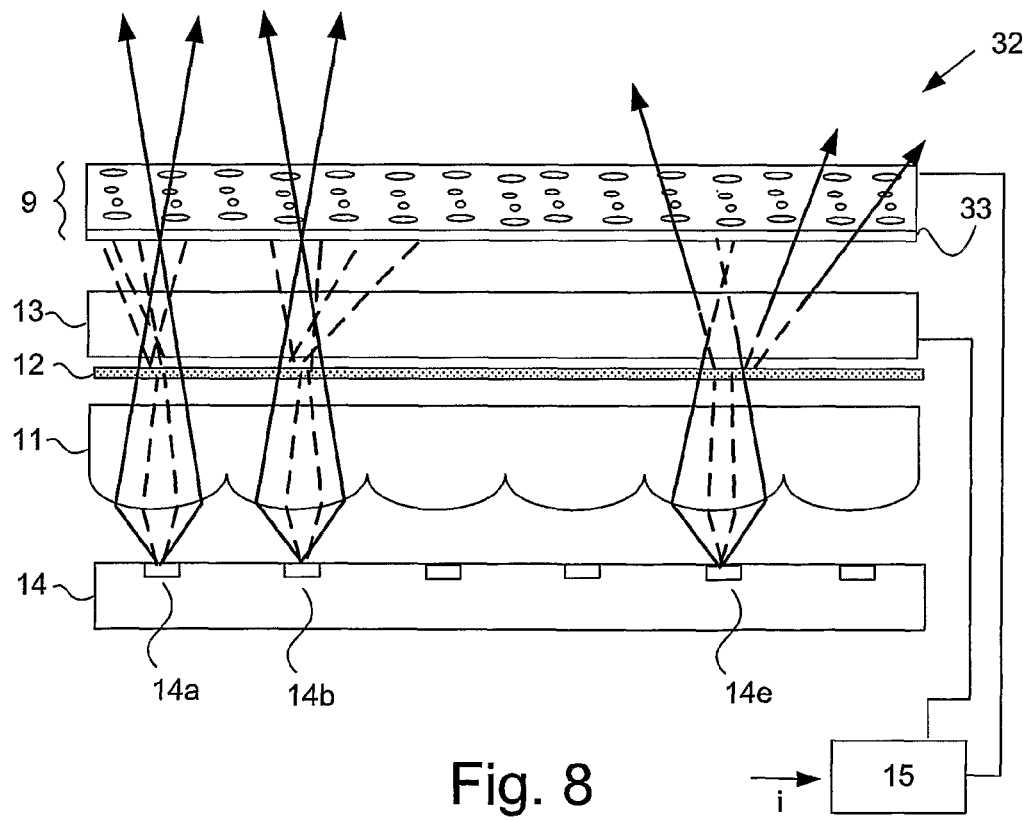
FIG. 8 is a schematic diagram of a display according to a third embodiment of the invention showing light paths through the display when operating in 3D and 2D imaging modes.

When the display 31 is used to present a 3D image, as shown in FIG. 8 in respect of the light lines emitted at positions 14a and 14b of the illumination system 14, the polarisation rotator 13 in its second mode. Thus, light lines of P-polarised light emerge from the polarisation rotator 13 and pass through the scatterer 12, undergoing little or no scattering to illuminate the display panel 9.

FIG. 7 also depicts the light path of a light line emitted at position 14e of the illumination system 14, when the display 31 is used to present a 2D image. In this case, the polarisation rotator 13 is operated in its first mode. Therefore, the light lines emerging from the polarisation rotator 13 are S-polarised and are scattered by the scatterer 12, providing uniform illumination for the display panel 9.

FIG. 8 depicts a display 32 according to a third embodiment of the invention. The display 32 differs from the display 8 of FIG. 2 in that the display panel 9 is a LCD which is equipped with a rear polariser 33. The rear polariser 33 is used in place of the polariser 10 of the first embodiment. In addition, the scatterer 12 is located between the lenticular screen 11 and polarisation rotator 13.

The illumination system 14 emits light lines of both P- and S-polarisation, which are imaged by the lenticular screen 11. The S-polarised components of the light lines are then scattered by the scatterer 12, while the P-polarised light passes through relatively unscattered.

When the display 32 is used to present a 3D image, as shown in FIG. 8 in respect of the light lines emitted at positions 14a and 14b of the illumination system 14, the polarisation rotator 13 is operated in its second mode. Thus, light lines of P-polarised light pass through the rear polariser 33 to illuminate the display panel 9, while the scattered S-polarised light is blocked by the rear polariser 33.

FIG. 8 also depicts the light path of a light line emitted at position 14e of the illumination system 14 when the display 32 is used to present a 2D image. Here, the polarisation rotator 13 is operated in its first mode. Therefore, the light lines emerging from the polarisation rotator 13 are S-polarised and are blocked by the rear polariser 33, while the scattered light leaving the polarisation rotator 13 is P-polarised. The P-polarised scattered light passes through the rear polariser 33, providing uniform illumination for the display panel 9.

Figure 9:
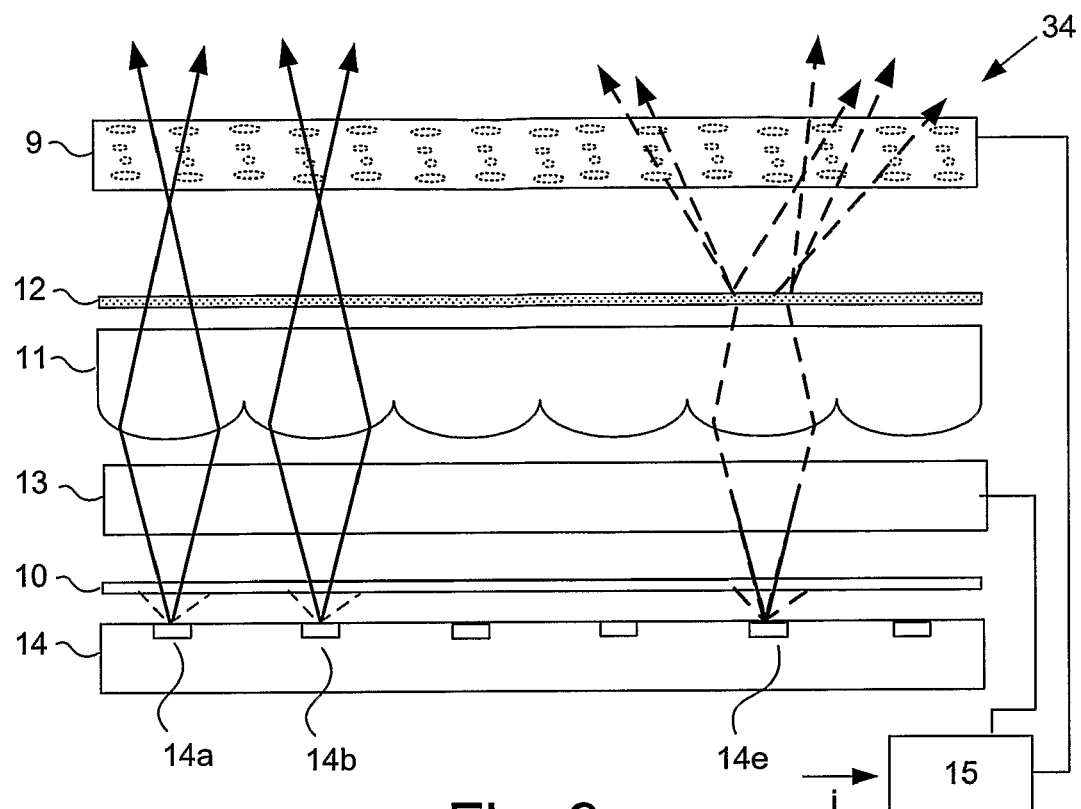
FIG. 9 is a schematic diagram of a display according to a fourth embodiment of the showing light paths through the display when operating in 3D and 2D imaging modes.

A display 34 according to a fourth embodiment of the invention is shown in FIG. 9. As in the previous embodiments, the illumination system 14 emits light lines comprising both P- and S-polarised components. S-polarised light is blocked by the polariser 10, while P-polarised light passes through and enters the polarisation rotator 13.

When the display 33 is presenting a 3D image, the polarisation rotator 13 is operated in its second mode, so that the light lines leaving the polarisation rotator 13 are P-polarised. The P-polarised light lines are imaged by the lenticular screen 11 and pass through the scatterer 12 with little or no scattering, to illuminate the display panel 9. The operation of the display 33 in a 3D imaging mode is shown in FIG. 9 in respect of the light lines emitted at positions 14a and 14b of the illumination system 14.

When the display 33 is presenting a 2D image, the polarisation rotator 13 it is operated in its first mode, so that the light lines emerging from the polarisation rotator 13 are S-polarised. The light lines are thus scattered by the scatterer 12, to provide uniform illumination for the display panel 9. The operation of the display 33 when in a 2D imaging mode is depicted in FIG. 9 for a light line emitted at position 14e of the illumination system 14.

Figure 10:
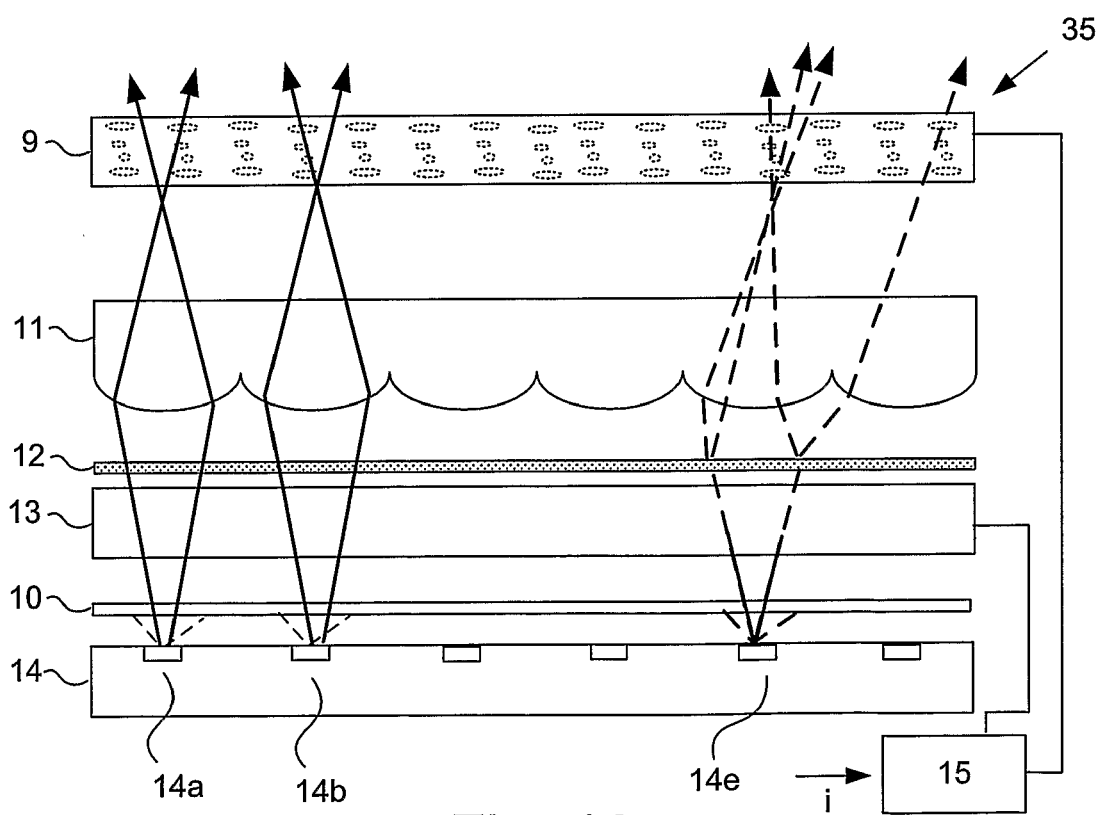
FIG. 10 is a schematic diagram of a display according to a fifth embodiment of the invention showing light paths through the display when operating in 3D and 2D imaging modes.

FIG. 10 depicts a display 35 according to a fifth embodiment of the invention. The display 35 differs from that shown in FIG. 8 in the positioning of the polarisation-dependent scatterer 12. In this embodiment, the scatterer 12 is located between the polarisation rotator 13 and lenticular screen 11.

As described above, in relation to the previous embodiments, the illumination system 14 emits light lines comprising both P- and S-polarised components. The S-polarised components are blocked by the polariser 10, while the P-polarised components are transmitted.

When the display 35 is presenting a 3D image, the polarisation rotator 13 is operated in its second mode. Thus, the P-polarised light lines pass through the scatterer 12 with little or no scattering and are imaged by the lenticular screen 11 to illuminate the display panel 9, as shown in respect of the light line emitted at position 14b of the illumination system 14.

When the display 35 is presenting a 2D image, the light lines emerging from the polarisation rotator 13 are S-polarised and so are scattered by the scatterer 12, before being focussed by the lenticular screen 11. This is depicted in FIG. 10 for a light line emitted from position 14e of the illumination system 14. The scattered light provides uniform illumination for the display panel 9.

Figure 11:
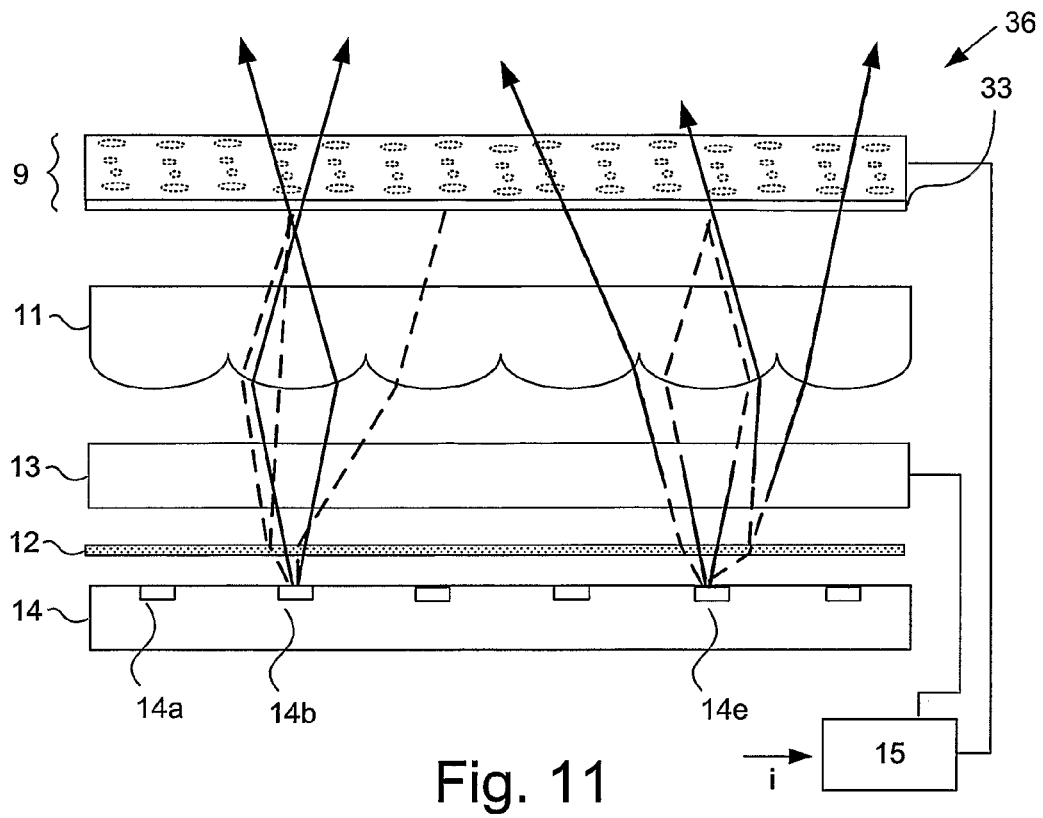
FIG. 11 is a schematic diagram of a display according to a sixth embodiment of the invention showing light paths through the display when operating in 3D and 2D imaging modes.

FIG. 11 depicts a display 36 according to a sixth embodiment of the invention. As in the third embodiment described above, the display 36 comprises a display panel 9 in the form of a LCD with a rear polariser 33, which is used in place of a separate polariser. In addition, the scatterer 12 is positioned between the illumination system 14 and polarisation rotator 13.

The operation of the display 36 in a 3D imaging mode will now be described with reference to an example light line that is emitted at position 14b of the illumination system 14. P-polarised components of the light line pass through the scatterer 12 with little or no scattering and enter the polarisation rotator 13. Here, the polarisation rotator 13 is operated in its second mode and so does not alter the polarisation of light passing therethrough. The P-polarised light line is then imaged by the lenticular screen 11, passes through the rear polariser 33 and illuminates the display panel 9.

Meanwhile, S-polarised components of the light line are scattered by the scatterer 12. The S-polarised scattered light passes through the polarisation rotator 13 and is imaged by the lenticular screen 11 before being blocked by the rear polariser 33.

When the display 36 is presenting a 2D image, the scatterer 12 transmits the P-polarised light with little or no scattering in the light lines and scatters the S-polarised light, as is shown in FIG. 11 for a light line emitted at position 14e of the illumination system 14. The polarisation rotator 13 is operated in its first mode. Thus, incident P-polarised light lines emerge from the polarisation rotator as S-polarised light lines, which are imaged by the lenticular screen 11 and then blocked by the rear polariser 33. The scattered S-polarised light entering the polarisation rotator 13 emerges with P-polarisation and is imaged by the lenticular screen 11 before passing through the rear polariser 33 to illuminate the display panel 9.

Figure 12:
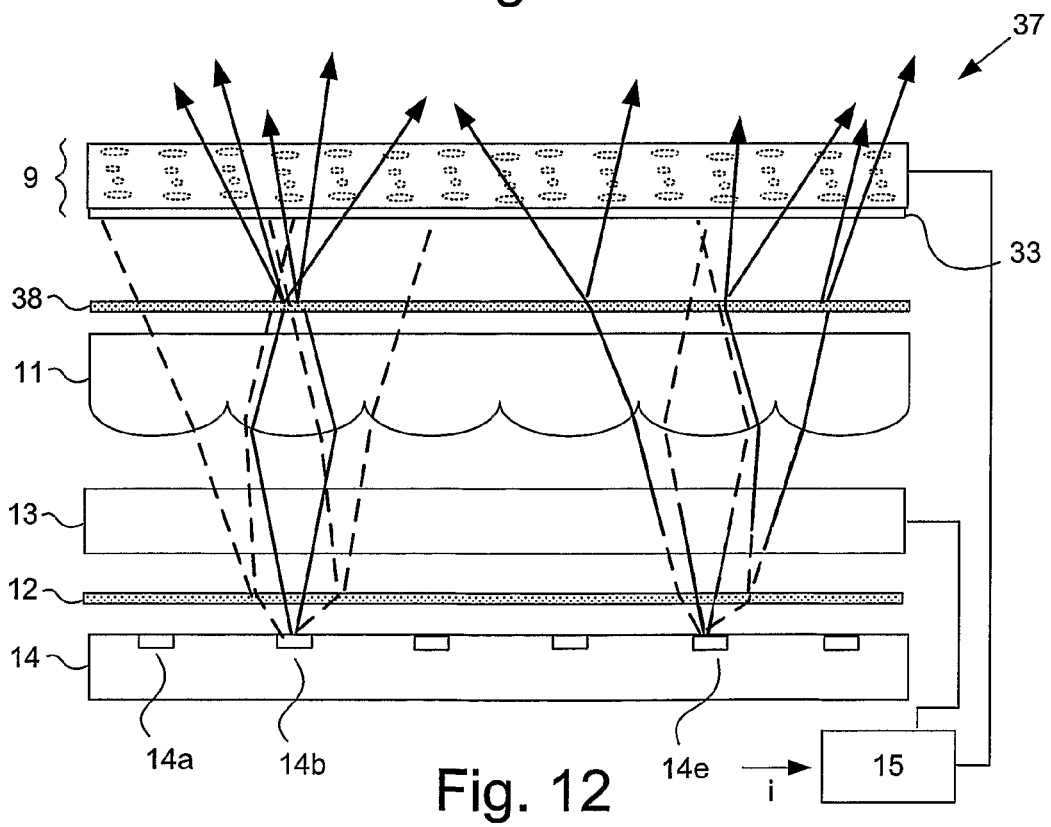
FIG. 12 is a schematic diagram of a display according to a seventh embodiment of the invention showing light paths through the display when operating in 3D and 2D imaging modes.

FIG. 12 depicts a display 37 according to a seventh embodiment of the invention. The display 37 is similar to the display 36 of FIG. 11. However, in this arrangement, the display panel 9 can be illuminated with light lines having a relatively large opening angle compared with the previously described embodiments. This is achieved by providing a second polarisation-dependent scatterer 38. As in the previous embodiments, the scatterer 12 is configured to scatter S-polarised light. However, the second scatterer 38 is arranged to scatter P-polarised light while allowing S-polarised light to pass through relatively unscattered.

The operation of this arrangement as described above in relation to the display 36 of FIG. 11 for light lines emitted by the illumination system 14 at positions 14b and 14e, with respect to their passage through the scatterer 12, polarisation rotator 13 and lenticular screen 11.

When the display 37 is operating in a 3D imaging mode, P-polarised light lines imaged by the lenticular screen 11 are scattered by the second scatterer 38 but then pass through the rear polariser 33 to illuminate the display panel 9. Due to the effect of the second scatterer 38, the opening angle of the light lines illuminating the display panel 9 is increased. Meanwhile, S-polarised light passes through the second scatterer 38 and is blocked by the rear polariser 33. The paths followed the P- and S-polarised components of a light line emitted at position 14b of the illumination system 14 are shown in FIG. 12.

When the display 37 is operating in a 2D imaging mode, the light lines emerging from the polarisation rotator 13 have S-polarisation. This is shown in FIG. 12 for a light line emitted from position 14e of the illumination system 14. The light lines are imaged by the lenticular screen 11 and pass through the second scatterer 38 with little or no scattering. However, being S-polarised, the light lines are blocked by the rear polariser 33. The scattered light emerging from the polarisation rotator 13 is P-polarised and is imaged by the lenticular screen 11 before being scattered by the second scatterer 38. The scattered light then passes through the rear polariser 33 to provide uniform illumination for the display panel 9.

Figure 13:
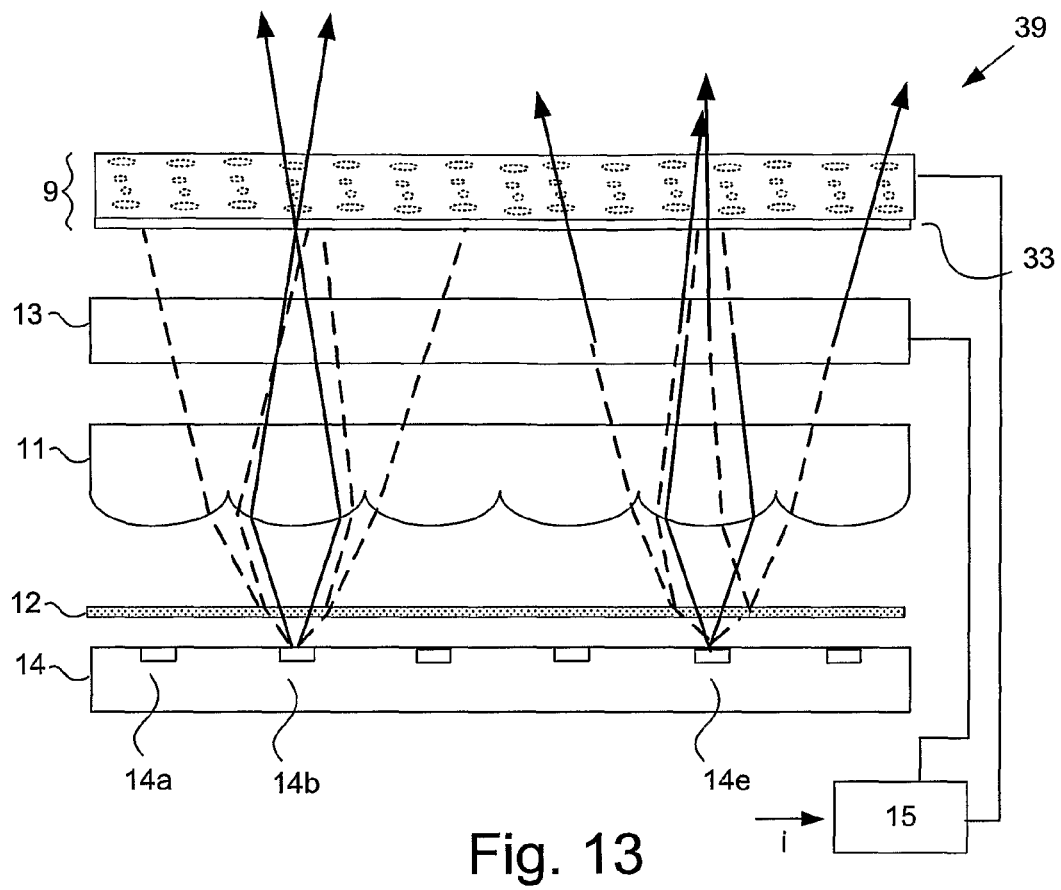
FIG. 13 is a schematic diagram of a display according to an eighth embodiment of the invention showing light paths through the display when operating in 3D and 2D imaging modes.

FIG. 13 shows a display 39 according to a eighth embodiment of the invention. The display 39 differs from the display 36 of FIG. 11 in that the positions of the lenticular screen 11 and polarisation rotator 13 are interchanged.

As in the previous embodiments, light lines comprising P- and S-polarised components are generated by the illumination system 14. The scatterer 12 transmits P-polarised light with little or no scattering but scatters S-polarised light. The resulting P-polarised light lines and S-polarised scattered light are focussed by the lenticular screen 11 before entering the polarisation rotator 13.

When the display 39 is presenting a 3D image, the polarisation rotator 13 is operated in its second mode, and so the P-polarised light lines emerge from the polarisation rotator 13 and pass through rear polariser 33 to illuminate the display panel 9. However, the S-polarised scattered light is blocked by the rear polariser 33. FIG. 13 shows the light paths followed by the P- and S-polarised components of a light line emitted at position 14b by the illumination system 14.

With reference to the light line emitted at position 14e by the illumination system 14, when the display 39 is presenting a 2D image, the P-polarised light lines become S-polarised when passing through the polarisation rotator 13 and so are blocked by the rear polariser 33. The polarisation rotator 13 changes the polarisation of the scattered S-polarised light to P-polarisation. The scattered light then passes through the rear polariser 33 to illuminate the display panel 9.

Figure 14:
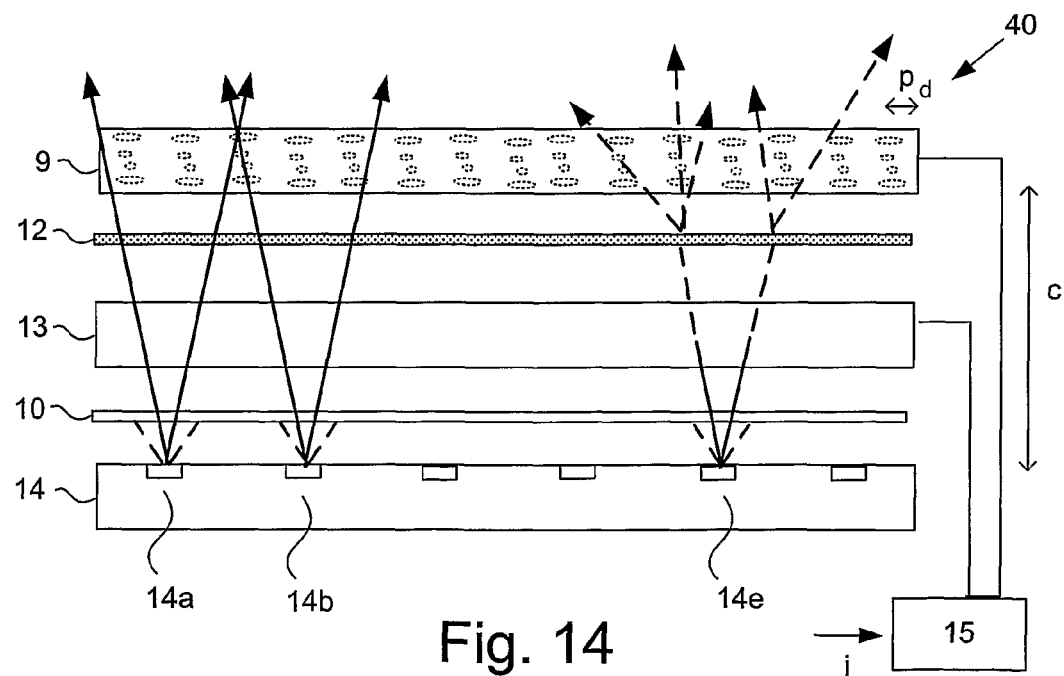
FIG. 14 is a schematic diagram of a display according to a ninth embodiment of the invention showing light paths through the display when operating in 3D and 2D imaging modes.

FIG. 14 depicts a display 40 according to a ninth embodiment of the invention. The display 40 is similar to the display 34 of FIG. 9 but differs in that the lenticular screen 11 of the fourth embodiment is not provided.

While the omission of the lenticular screen provides a cost advantage over prior arrangements, the light lines generated by the illumination system 14 are not focussed within the display 40. As a result, the light lines appear to be generated at a position further away from the display panel 9, when compared with the displays of the previous embodiments, so that relatively smaller viewing zones are created by the display 40. In order to counteract this effect, it may be necessary for the LCD of the display panel 9 to comprise relatively thin substrates. For example, if the display 40 forms part of a mobile telephone (not shown), the typical distance d between a viewer and the display 40 is 400 mm. In order to correspond with the left and right eyes of potential viewers, the viewing zones for multiple views A, B have a parallax a of approximately 65 mm apart at the viewing distance d. If the pixel pitch $p_d$ is 45 µm, the distance c of the illumination system 14 from the display panel 9 can, be determined using Equation [2] above to be approximately 270 µm. This is significantly lower than the typical thickness of the substrate of a LCD in a mobile telephone, which is at least 400 µm.

When the display 40 is presenting a 3D image, the P-polarised components of the light lines, for example, the light lines emitted at positions 14a and 14b of the illumination system 14, pass through the polariser 10 and through polarisation rotator 13 without any change to their polarisation. The P-polarised light lines then pass through the scatterer 12 to illuminate the display panel 9. The S-polarised components of the light lines are blocked by the polariser 10.

When the display 40 is presenting a 2D image, P-polarised components of the light lines, such as the light line emitted at position 14e of the illumination system 14, pass through the polariser 10, while S-polarised components is blocked. The resulting P-polarised light lines then pass through polarisation rotator 13 and emerge as S-polarised light lines which are scattered by the scatterer 12. The S-polarised scattered light thus provides uniform illumination for the display panel 9.

In addition to the cost advantage noted above, the omission of a lenticular screen may provide greater flexibility in the display of images. If the illumination system 14 is operable to allow changes in the positions 14a, 14b, 14e at which light lines are generated, for example, under the control of the controller 15, the absence of a lenticular screen may allow the positions of the viewing zones for multiple views A, B to be varied to allow for movement by a viewer.

Figure 15:
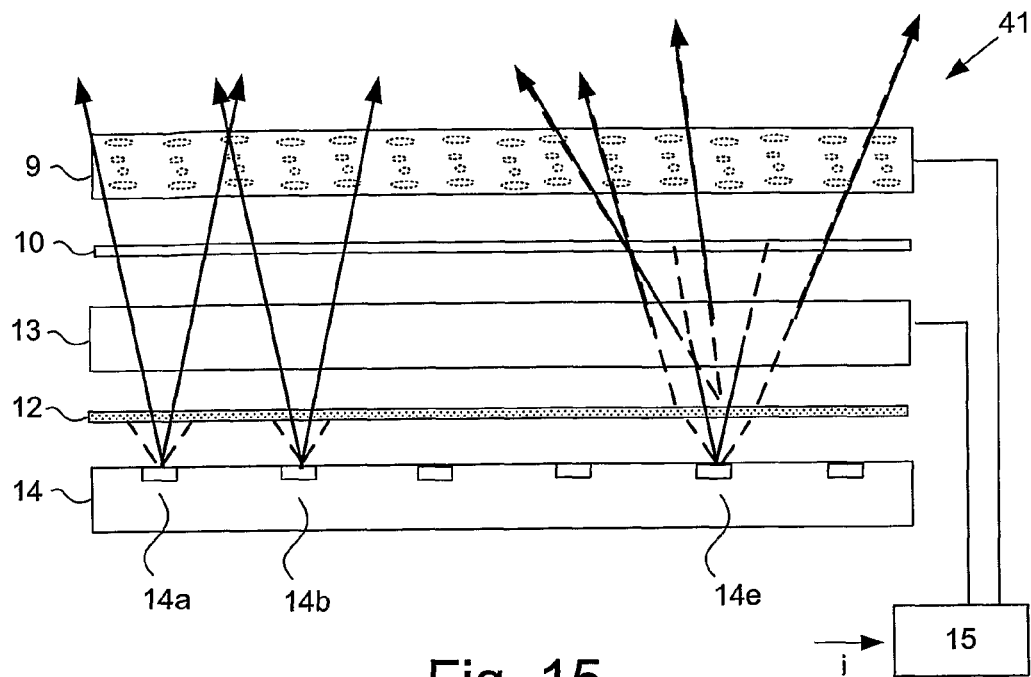
FIG. 15 is a schematic diagram of a display according to a tenth embodiment of the invention showing light paths through the display when operating in 3D and 2D imaging modes.

FIG. 15 depicts a display 41 according to a tenth embodiment of the invention. The display 41 is similar to the display 40 of FIG. 14 but differs in that the positions of the scatterer 12 and polariser 10 are interchanged.

When the display 41 is presenting a 3D image, the polarisation rotator 13 is operated in its second mode. Hence, P-polarised components of the light lines, pass through the scatterer 12 and the polarisation rotator 13 without little or no scattering and, in this example, without a significant change in their polarisation. The P-polarised light lines then pass through the polariser 10 to illuminate the display panel 9, as shown in FIG. 15 in respect of light lines emitted at positions 14a and 14b of the illumination system 14. The S-polarised components are scattered by the scatterer 12 and pass through the polarisation rotator 13 with its polarisation unchanged before being blocked by the polariser 10.

When the display 41 is presenting a 2D image, the P-polarised components of the light lines pass through the scatterer 12 and polarisation rotator 13, emerging from the polarisation rotator 13 as S-polarised light which is blocked by the polariser 10. Meanwhile, the S-polarised components of the light lines are scattered by the scatterer 12 and emerge from the polarisation rotator 13 as P-polarised light. The scattered P-polarised light passes through the polariser 10 and illuminates the display panel 9. This is depicted in FIG. 15 in respect of a light line emitted at position 14e of the illumination system 14.

It should be noted that, in this particular embodiment, the scatterer 12 must be positioned at a sufficient distance from the illumination system 14 to allow the light scattered by the scatterer 12 to be substantially uniform across the display panel 9 when the display 41 is operated in a 2D imaging mode.

Figure 16:
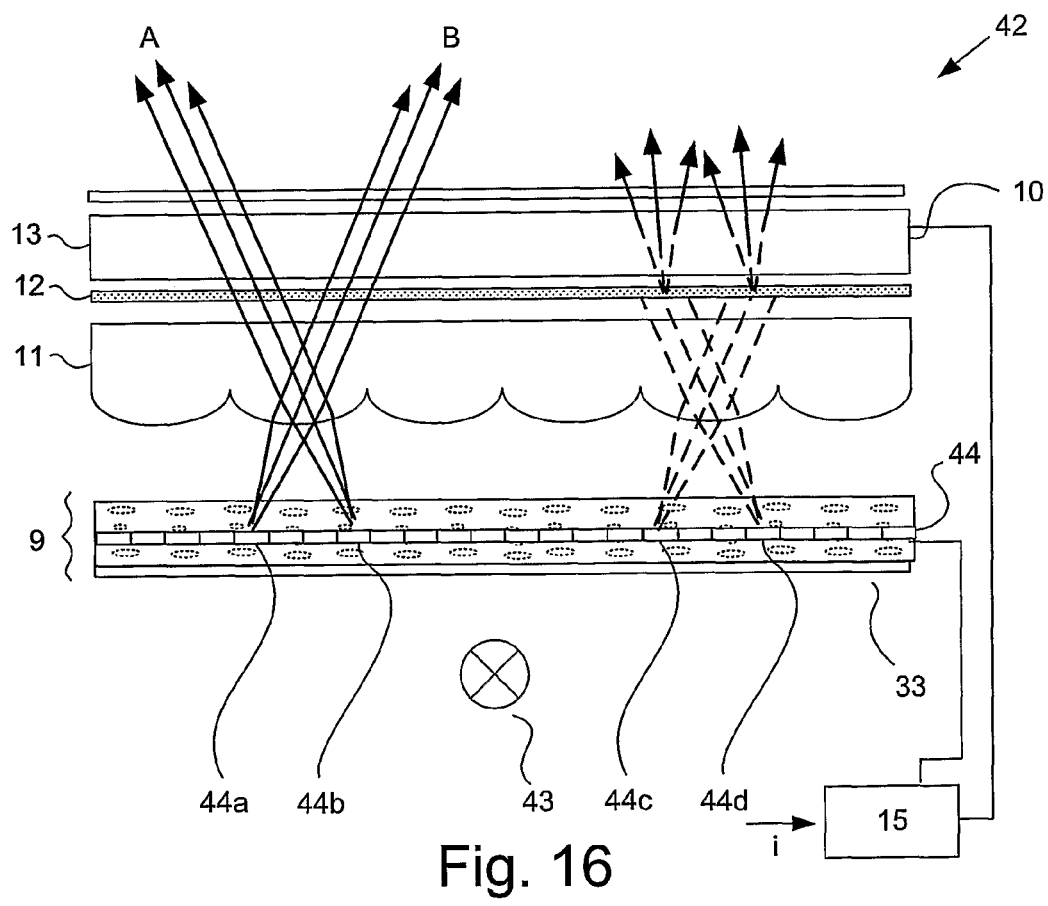
FIG. 16 is a schematic diagram of a display according to an eleventh embodiment of the invention showing light paths through the display when operating in 3D and 2D imaging modes.

FIG. 16 depicts a display 42 according to an eleventh embodiment of the invention. The display 42 comprises a display panel 9 in the form of a LCD with a rear polariser 33. However, a top polariser, or an analysing polariser, for selectively transmitting light emerging from the sub-pixels 42 of the LCD is not provided. The display 42 also comprises a lenticular screen 11, a polarisation-dependent scatterer 12, a polarisation rotator 13 and polariser 10, arranged in front of the display panel 9, so that they act on light emerging from the sub-pixels 43. This arrangement differs from the embodiments described above, in which the equivalent components were positioned to the rear of the display panel 9.

The display panel 9 is illuminated with a conventional backlight 43, that generates substantially uniform illumination. Depending on the configuration of the rear polariser 33, light with either P-polarisation or S-polarisation enter the display panel 9 and illuminate the sub-pixels 44.

When the display 42 is presenting a 3D image, the sub-pixels 44 are arranged so that P-polarised light emerges from the display panel 9, as shown for sub-pixels 44a and 44b in FIG. 16. The P-polarised light is imaged into viewing zones by the lenticular screen 11 and passes through the scatterer 12 with little or no scattering. The P-polarised light then passes through the polarisation rotator 13, which is operated to transmit light without altering its polarisation, and the polariser 10, and then leaves the display 42, to present multiple views A, B in respective viewing zones.

The presentation of a 2D image by the display 42 will now be described, with reference to the light paths for light from sub-pixels 44c and 44d as shown in FIG. 16. S-polarised light emerges from the sub-pixels 44, which is focussed by the lenticular screen 11 and then scattered by the scatterer 12, before entering the polarisation rotator 13. The S-polarised light emerges from the polarisation rotator 13 with P-polarisation and so passes through the polariser 10 and leaves the display panel 9.

Figure 17:
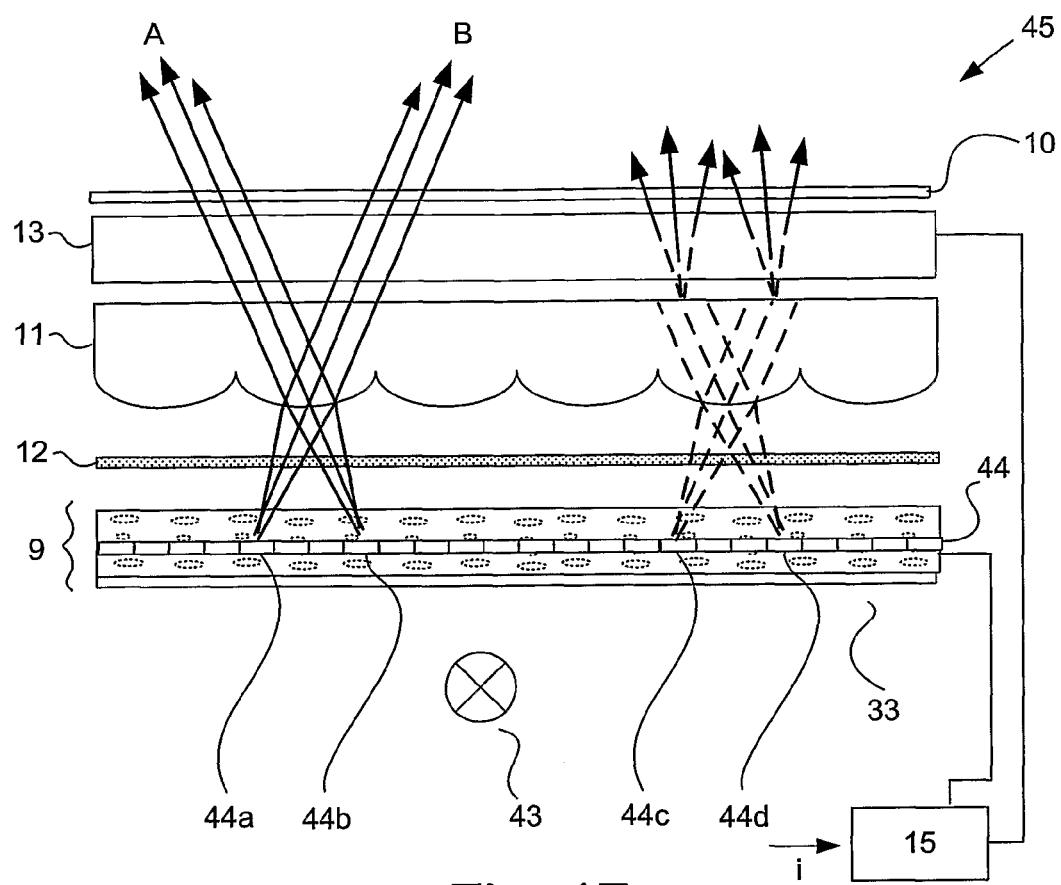
FIG. 17 is a schematic diagram of a display according to a twelfth embodiment of the invention showing light paths through the display when operating in 3D and 2D imaging modes.

A display 45 according to a twelfth embodiment of the invention is shown in FIG. 17. The display 45 is similar to the display 42 of FIG. 16, but differs in that the positions of the lenticular screen 11 and scatterer 12 are interchanged.

When the display 45 is presenting a 3D image, the sub-pixels 44 are arranged so that P-polarised light emerges from the display panel 9, as shown for sub-pixels 44a and 44b in FIG. 16. The P-polarised light passes through the scatterer 12 with little or no scattering and is then is focussed by the lenticular screen 11 so as to generate images of views A, B in their respective viewing zones. The P-polarised light then passes through the polarisation rotator 13, without changing its polarisation. The P-polarised light then passes through the polariser 10 and leaves the display 45, to present the multiple views A, B.

When the display 45 is presenting a 2D image, S-polarised light emerges from the sub-pixels 44, as shown for sub-pixels 44c and 44d in FIG. 16. The S-polarised light is scattered by the scatterer 12 before being focussed by the lenticular screen 11. The polarisation rotator 13 causes the light to become P-polarised. The P-polarised light can thus pass through the polariser 10 and leave the display panel 9.

In this particular embodiment, the scattering profile of the scatterer 12 is limited in order to avoid a reduction in resolution when a 2D image is displayed, due to blurring of the images from adjacent sub-pixel columns 44c, 44d. Depending on the configuration of the display 42, a suitable scattering angle may be in the range of 5° to 20°.

Figure 18:
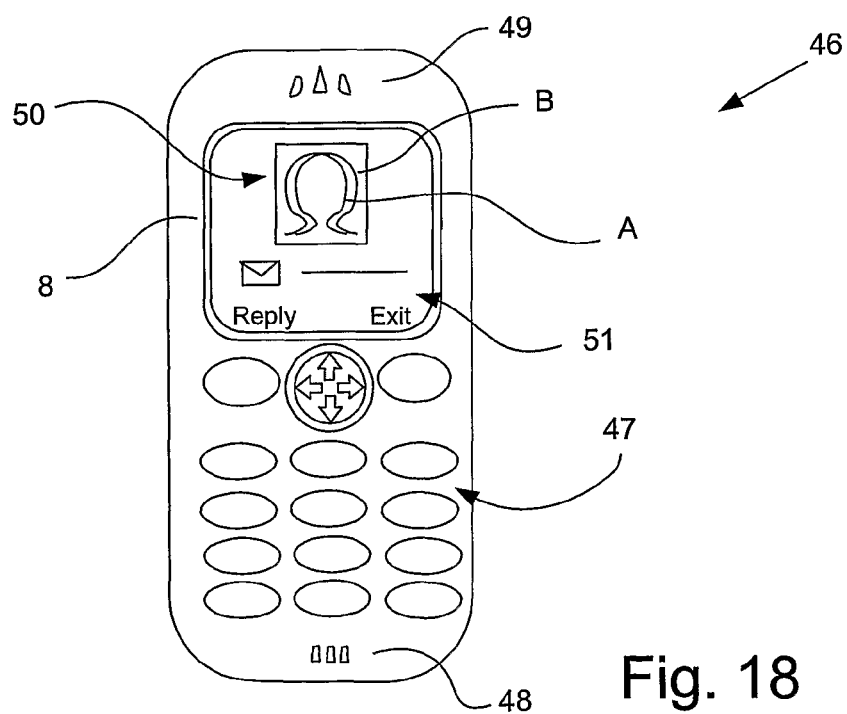
FIG. 18 is a schematic diagram of a mobile telephone comprising the display of FIG. 2.
Figure 19:
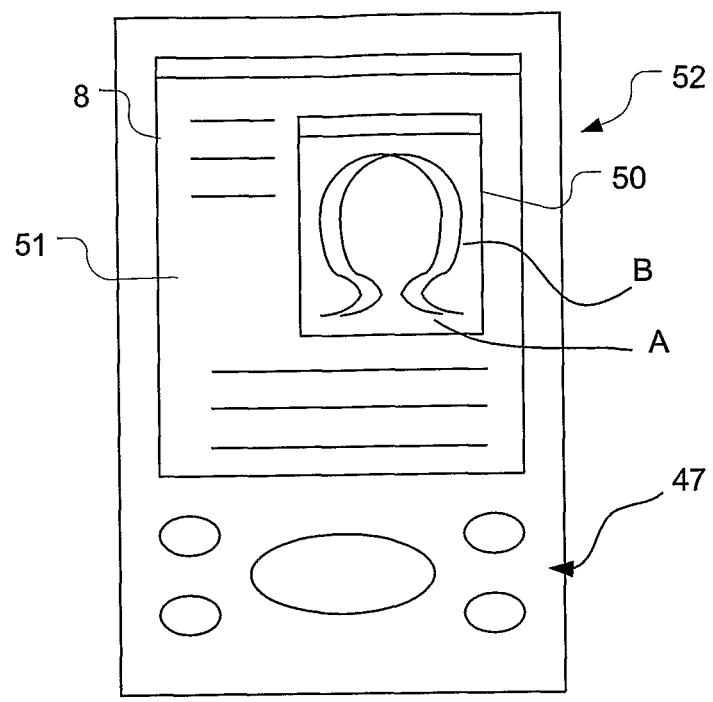
FIG. 19 is a schematic diagram of a personal digital assistant comprising the display of FIG. 2.
Figure 20:
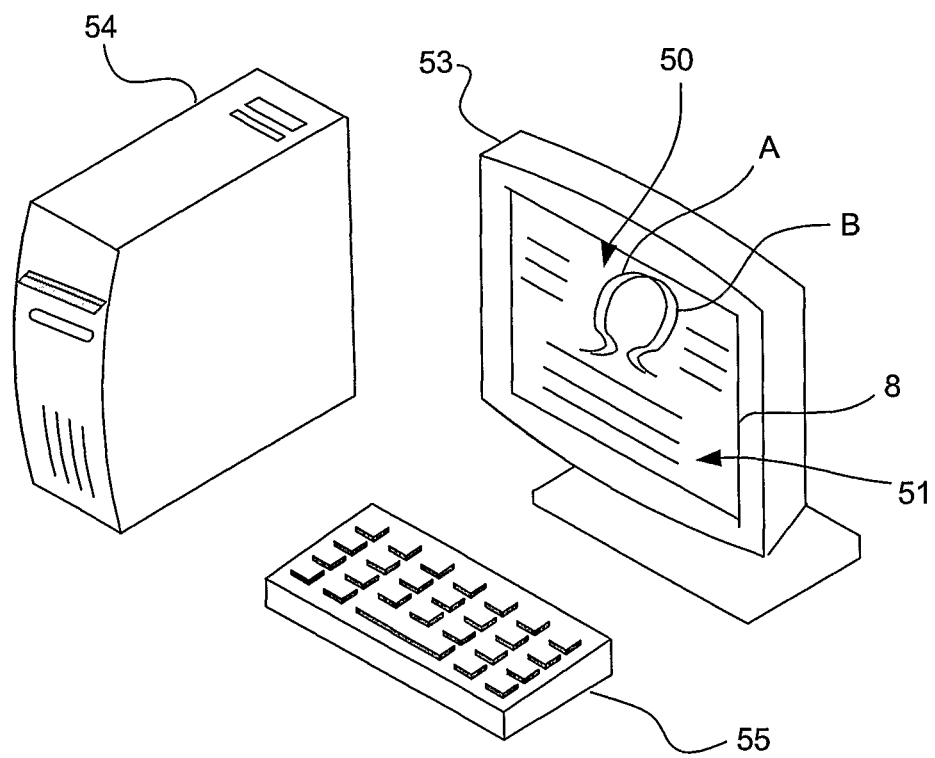
FIG. 20 depicts a desktop monitor comprising the display of FIG. 2.

The displays 8, 14, 32, 34, 35, 36, 37, 39, 40, 41, 42, 45 described above may be used in any device arranged to display images. FIGS. 18, 19 and 20 depict example devices comprising the display 8 shown in FIG. 2.

FIG. 18 depicts a mobile telephone handset 46, comprising a user interface, in the form of display 8 and keypad 47, a microphone 48 and speaker 49. The display 8 is configured with a resolution adequate for the display of images and video and may, if required, be capable of displaying colour images. In FIG. 18, the display 8 is arranged to present a 3D picture 50, comprising two views A and B. In an area around the 3D picture 50, a 2D image, such as text 51 or wallpaper, is displayed.

FIG. 19 depicts a personal digital assistant (PDA) 52 comprising the display 8 in a user interface that further comprises keys 47. FIG. 19 shows examples of displayed images in the form of a 3D image 50 and 2D text 51.

FIG. 20 depicts a desktop monitor 53 comprising the display 8, for displaying images based on image data output by a personal computer (PC) 54. The display 8, keyboard 55 and, if required, a mouse device (not shown) provide a user interface for the PC 54. In this figure, the desktop monitor 52 is shown when displaying a 3D image 50 and 2D text 51 simultaneously.

While FIGS. 18, 19 and 20 depicted a mobile telephone handset 46, PDA 52 and desktop monitor 53 comprising a display 8 according to the invention, the display of the present invention is not limited to use in these particular devices. The display 8 may be incorporated in, for example, other communication devices, games consoles and devices, televisions, automotive displays and displays for or in audio/visual equipment, whether fixed or portable.

Furthermore, a display according to any one of the second to twelfth embodiments could be provided while the devices shown in FIG. 18, 19 or 20, in place of the display 8 of FIG. 2. However, as described in detail above, if the display lacks a lenticular screen 11, as in the eighth and ninth embodiments, it may be necessary to use relatively thin substrates in the display panel 9.

From reading the present disclosure, other variations and modifications will be apparent to persons skilled in the art. Such variations and modifications may involve equivalent and other features which are already known in the design, manufacture and use of electronic devices comprising liquid crystal displays, alternative display devices or transflectors and component parts thereof and which may be used instead of or in addition to features already described herein.

In the above described embodiments, P-polarised light is used in 3D imaging and S-polarised light in 2D imaging. However, the displays may be arranged so that S-polarised light is used for 3D imaging and P-polarised light for 2D imaging, by providing an appropriate polariser 10 and using a scatterer 12 that scatters P-polarised light but transmits S-polarised light without scattering and, where the display panel 9 is a LCD, by changing the orientation of the retarders and polarisers 33 of the display panel 9.

In each of the above described embodiments, the polarisation rotator 13 is configured so that light passes through it without any change in polarisation when the display is in a 3D imaging mode. However, this is not necessarily the case. The polarisation rotator 13 may be arranged to apply a fixed minimum rotation, so that, in 3D mode, the minimum rotation is applied while, in 2D mode, the polarisation is rotated by a different amount, for example, by the minimum rotation plus 90 degrees. Any polarisers 10, 33 arranged to receive light that has passed through such a polarisation rotator 13 must be configured to admit and block light with such rotated polarisations.

While the polarisation rotator 13 in the above embodiments is a LC cell, other types of switchable polarisation rotator may be used, including mechanical polarisation rotators.

In the above described embodiments, 3D images are presented in a "normally white" mode, while 2D images are presented in a "normally black" mode. These modes can be interchanged. In any case, the effects of the inverted contrast on the displayed image can be counteracted by electronically inverting the image for display in one of the "normally white" and "normally black" modes, in a manner well known per se.

The features of the above embodiments have been described in relation to sub-pixels 44 of the display panel 9 and their pitch $p_d$. However, if required, the above described displays could be configured to display 3D images using alternate columns of pixels, rather than columns of sub-pixels 44. This may be particularly appropriate where the display panel 14 is a monochrome display.

Although the simultaneous display of 2D and 3D images is described in respect of the display 8 of FIG. 2, this effect can be achieved using any of the other described displays, where the polarisation rotator 13 can be operated to change the polarisation of light passing through it in one or more selected areas only.

The placement of the lenticular screen 11, where provided, so that it is slanted with respect to the sub-pixel columns, is discussed above only in relation to the display 8 of FIG. 2. However, such placement may be used in any of the embodiments comprising such a lenticular screen 11. Similarly, if a slanted positioning is not required, the lenticular screen 11 of any of the first to eighth, eleventh and twelfth embodiments may be aligned with the sub-pixel columns. Whichever is the case, the alignment of any polarisers 10, 33 and the scatterer 12 with the lenticular screen 11 must be ensured.

In displays 40, 41 without lenticular screens, the illumination system 14 may be arranged so that the light lines it produces are slanted with respect to the columns of sub-pixels, in order to avoid the generation of visual artifacts, such as Moiré patterns.

The displays 32, 36, 37, 39 of FIGS. 8, 11, 12 and 13 each comprise a display panel 9 with a rear polariser 33. However, if required, these components may be replaced with a display panel 9 without a rear polariser 32 and a separate polariser 10 provided.

Furthermore, although the examples described relate to displays comprising a LCD display panel 9, other embodiments of the invention may utilise other types of light shutter display panels 9, including electrophoretic displays, electrochromic displays, electro-wetting displays and micromechanical displays, such as micro-electro-mechanical systems (MEMS). In the displays 42, 45 of the eleventh and twelfth embodiments, the display panel 9 may be a light emissive display device, such as a cathode ray tube (CRT), an array of light emitting diodes, an organic light emitting diode (OLED) display, a field emissive display (FED) and so on, in which case, the illumination system 14 may be omitted.

Although Claims have been formulated in this Application to particular combinations of features, it should be understood that the scope of the disclosure of the present invention also includes any novel features or any novel combination of features disclosed herein either explicitly or implicitly or any generalisation thereof, whether or not it relates to the same invention as presently claimed in any Claim and whether or not it mitigates any or all of the same technical problems as does the present invention. The Applicants hereby give notice that new Claims may be formulated to such features and/or combinations of such features during the prosecution of the present Application or of any further Application derived therefrom.

The invention claimed is:

1. A display (8), comprising:
   a display panel (9);
   a polariser (10);
   a polarisation rotator (13) that is selectively operable to change the polarisation of light transmitted therethrough; and
   a polarisation dependent scatterer (12) configured to scatter light having a first polarisation relative to light having a second polarisation;
   the polarisation rotator (13) being operable so that:
   in a first display mode, light scattered by the scatterer (12) is used to present a two-dimensional image (51); and
   in a second display mode, relatively unscattered light is used to present a three-dimensional image (50).

2. A display according to claim 1, wherein said light used to present a two-dimensional or three-dimensional image (51, 50) provides illumination for the display panel (9).

3. A display according to claim 1, wherein said light used to present a two-dimensional or three-dimensional image (51, 50) conveys image information to one or more viewing zones.

4. A display (8) according to claim 1, wherein:
   in the first display mode, light entering the polarisation rotator (13), having a first input polarisation, has the second polarisation when leaving the polarisation rotator (13), while light entering the polarisation rotator (13), having a second input polarisation, has the first polarisation when leaving the polarisation rotator (13); and
   in the second display mode, light entering the polarisation rotator (13), having a first input polarisation, has the first polarisation when leaving the polarisation rotator (13), while light entering the polarisation rotator (13), having a second input polarisation, has the second polarisation when leaving the polarisation rotator (13).

5. A display (8) according to claim 4, wherein:
   the polarisation rotator (13) is configured so that the first input polarisation is substantially the same as the first polarisation and the second input polarisation is substantially the same as the second polarisation.

6. A display (8) according to claim 4, wherein:
   said polarisation rotator (13) is operable so that light entering a first area of the polarisation rotator (13) and having the first and second input polarisations, leave the polarisation rotator (13) with the first and second polarisations respectively, while light entering a second area of the polarisation rotator (13) and having the first and second input polarisations leave the polarisation rotator (13) with the second and first polarisations respectively.

7. A display (8) according to claim 1, comprising:
   an illumination system (14) arranged to generate a plurality of light lines comprising components having the first polarisation and components having the second polarisation.

8. A display (8) according to claim 7, comprising:
   a lenticular screen (11) for imaging the light lines, arranged so that images of the light lines are created at a position between the lenticular screen (11) and the display panel (9).

9. A display (8) according to claim 7, wherein:
   said polariser (10) is located between said illumination system (14) and a lenticular screen (11), the lenticular screen (11) being arranged to create an image of the light lines by focussing the components having the first polarisation, at a position between the lenticular screen (11) and the display panel (9).

10. A display according to claim 1, wherein:
    said display panel (9) is a light-emissive display.

11. A display according to claim 1, wherein the display panel (9) is a liquid crystal device in which a rear polariser is not provided.

12. A display according to claim 1, wherein the display panel (9) is a liquid crystal device in which a top polariser is not provided.

13. A display according to claim 1, wherein the display panel (9) is a liquid crystal device and said polariser is a rear polariser (33) of the liquid crystal device.

14. A display (8) according to claim 1, wherein said scatterer (12) comprises a foil (16) in which a plurality of elongate particles (16a) is suspended.

15. A display (8) according to claim 1, wherein said scatterer (12) comprises a foil (17) embossed with a grating pattern.

16. A display (8) according to claim 14, wherein said foil (16, 17) is a stretched foil of poly ethylene terephtalate or poly ethylene naphtalate.

17. A display according to claim 1, comprising:
    a second scatterer (38), configured to scatter light having the second polarisation relative to light having the first polarisation.

18. Use of a display according to claim 1 for displaying a two-dimensional image (51) and a three-dimensional image (50).

19. Use of a display according to claim 6, wherein said two-dimensional image (51) and said three-dimensional image (50) are displayed simultaneously.

20. A communication device (46) comprising a display (8) according to claim 1.

21. A communication device (46) according to claim 20, in the form of a mobile telephone.

22. A computing device (52) comprising a display (8) according to claim 1.

23. A computing device according to claim 22, in the form of a laptop computer.

24. A computing device (52) according to claim 22, in the form of a personal digital assistant.

25. Audio/visual equipment (53) comprising a display (8) according to claim 1.

26. Audio/visual equipment (53) according to claim 25, in the form of a monitor arranged to present images generated by a computer (54).

* * * * *